US012654485B1

(12) United States Patent
Stachowiak

(10) Patent No.: US 12,654,485 B1
(45) Date of Patent: Jun. 16, 2026

(54) PAINT CAN PUNCTURING TOOL

(71) Applicant: Marty Stachowiak, Niagara Falls (CA)

(72) Inventor: Marty Stachowiak, Niagara Falls (CA)

( * ) Notice: Subject to any disclaimer, the term of this patent is extended or adjusted under 35 U.S.C. 154(b) by 16 days.

(21) Appl. No.: 18/887,138

(22) Filed: Sep. 17, 2024

(51) Int. Cl.
*B26F 1/32* (2006.01)
*B44D 3/12* (2006.01)

(52) U.S. Cl.
CPC .................................... *B44D 3/128* (2013.01)

(58) Field of Classification Search
CPC .......... B44D 3/128; B44D 3/127; B44D 3/00; B65D 2231/025; B65D 47/043; B65D 47/08; B65D 51/20; B67B 7/24
USPC ........ 220/890, 695, 733, 698; 222/570, 109, 222/485; 83/30, 660
See application file for complete search history.

(56) References Cited

U.S. PATENT DOCUMENTS

| | | | | |
|---|---|---|---|---|
| D321,325 S | 11/1991 | Petrus | | |
| 5,123,565 A | 6/1992 | Majewski | | |
| 5,535,657 A | 7/1996 | Bystrom | | |
| 5,568,665 A | 10/1996 | Fick | | |
| 6,237,227 B1 * | 5/2001 | Pojunas, Sr. | B26F 1/32 | 30/445 |
| 6,971,180 B2 | 12/2005 | Yocum | | |
| 8,839,696 B2 | 9/2014 | Harrington | | |
| 2020/0001491 A1 | 1/2020 | Attkisson | | |

FOREIGN PATENT DOCUMENTS

WO 2020010014 1/2020

* cited by examiner

*Primary Examiner* — Don M Anderson
*Assistant Examiner* — Elizabeth J Volz
(74) *Attorney, Agent, or Firm* — Kyle A. Fletcher, Esq.

(57) ABSTRACT

The paint can puncturing tool incorporates a tool structure and a paint can. The paint can is configured for use in storing paint. The tool structure punches a plurality of fluid ports into the paint can. The plurality of fluid ports allows the paint contained in the paint can to flow out of the paint can in a controlled manner.

8 Claims, 5 Drawing Sheets

PAINT CAN PUNCTURING TOOL

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Not Applicable

SUMMARY OF INVENTION

The paint can puncturing tool comprises a tool structure and a paint can. The paint can is configured for use in storing paint. The tool structure punches a plurality of fluid ports into the paint can. The plurality of fluid ports allows the paint contained in the paint can to flow out or back into in a controlled manner.

These together with additional objects, features and advantages of the paint can puncturing tool will be readily apparent to those of ordinary skill in the art upon reading the following detailed description of the presently preferred, but nonetheless illustrative, embodiments when taken in conjunction with the accompanying drawings.

In this respect, before explaining the current embodiments of the paint can puncturing tool in detail, it is to be understood that the paint can puncturing tool is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the paint can puncturing tool.

It is therefore important that the claims be regarded as including such equivalent construction insofar as they do not depart from the spirit and scope of the paint can puncturing tool. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
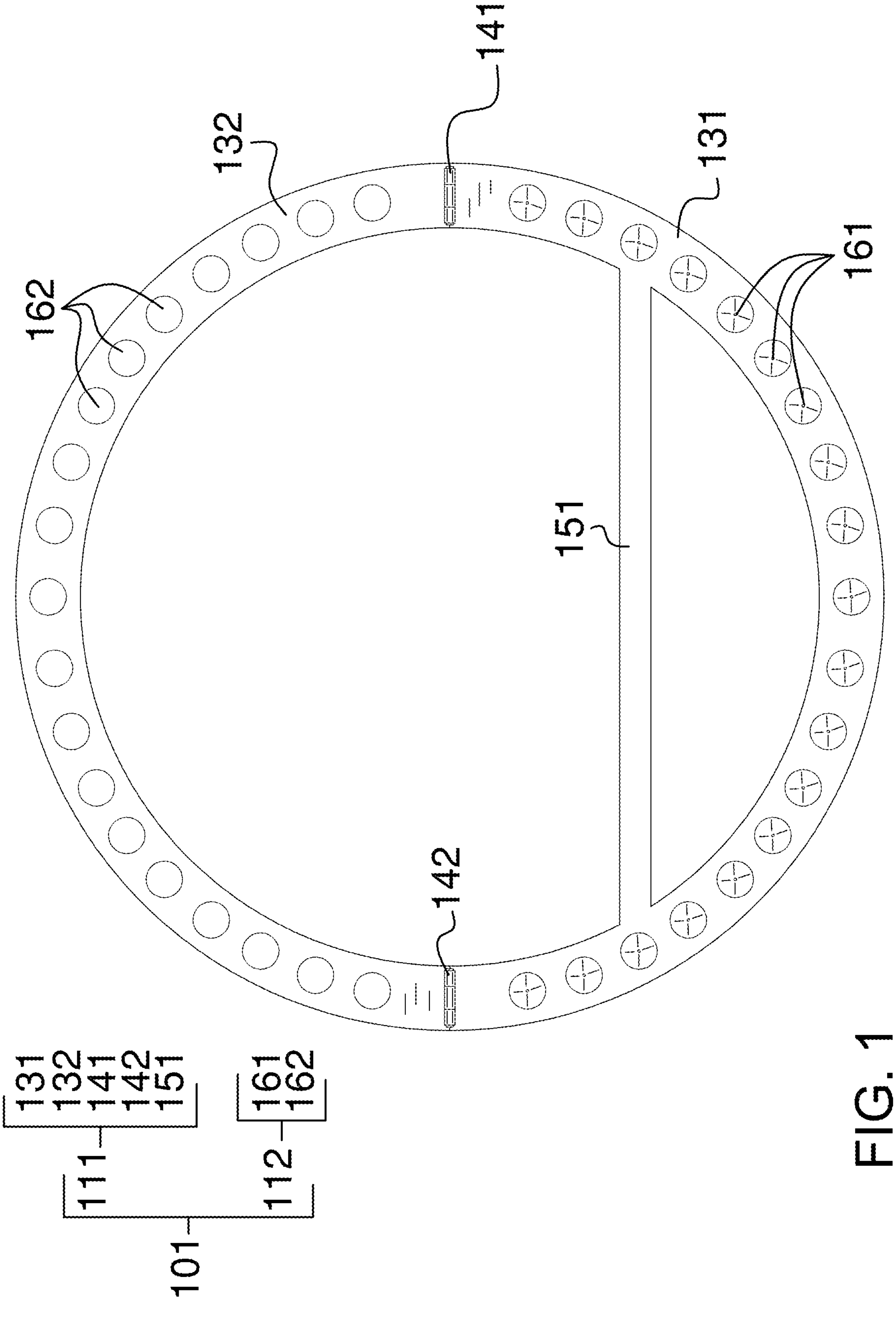
FIG. 1 is a front view of an embodiment of the disclosure.
Figure 2:
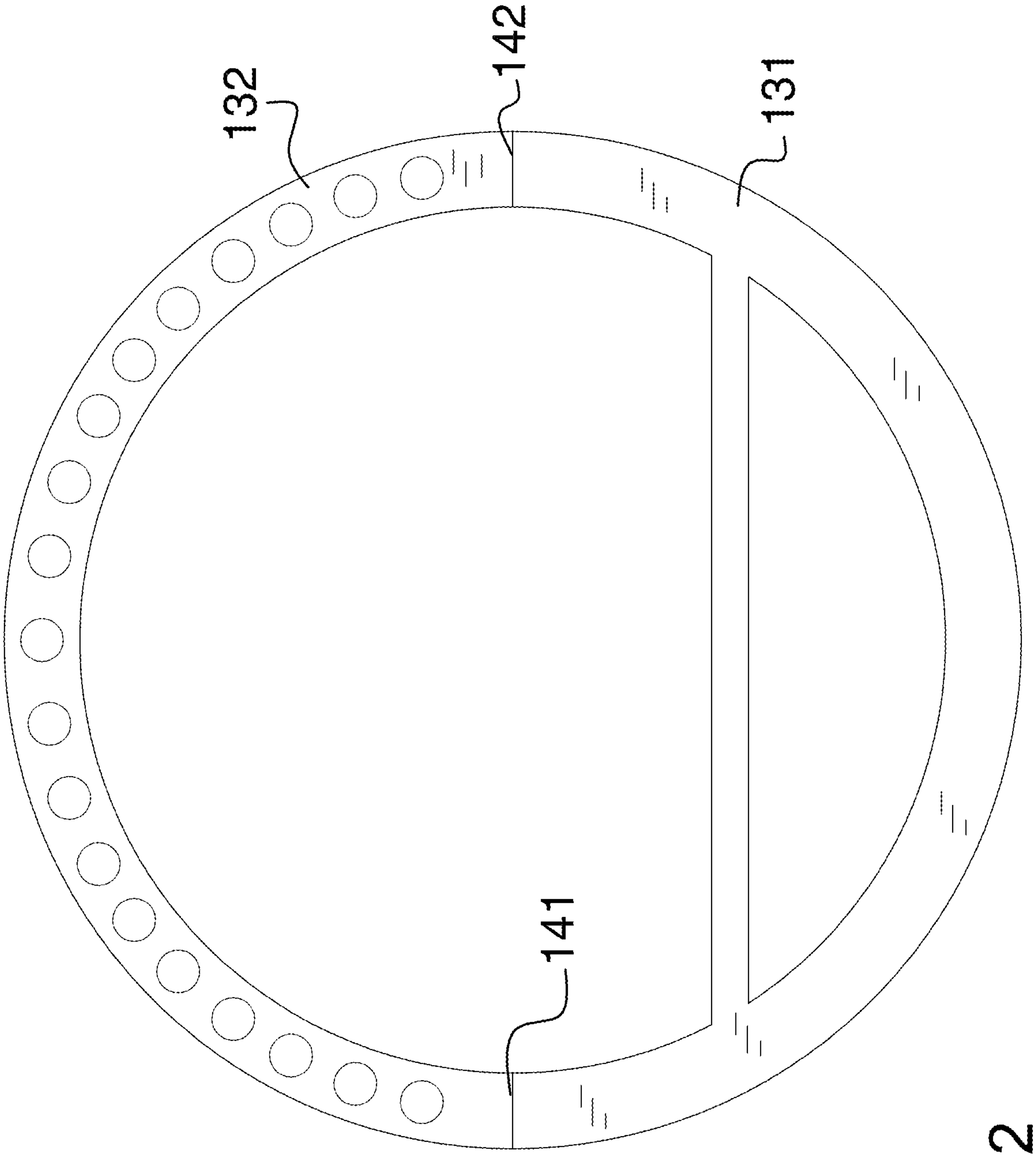
FIG. 2 is a rear view of an embodiment of the disclosure.
Figure 4:
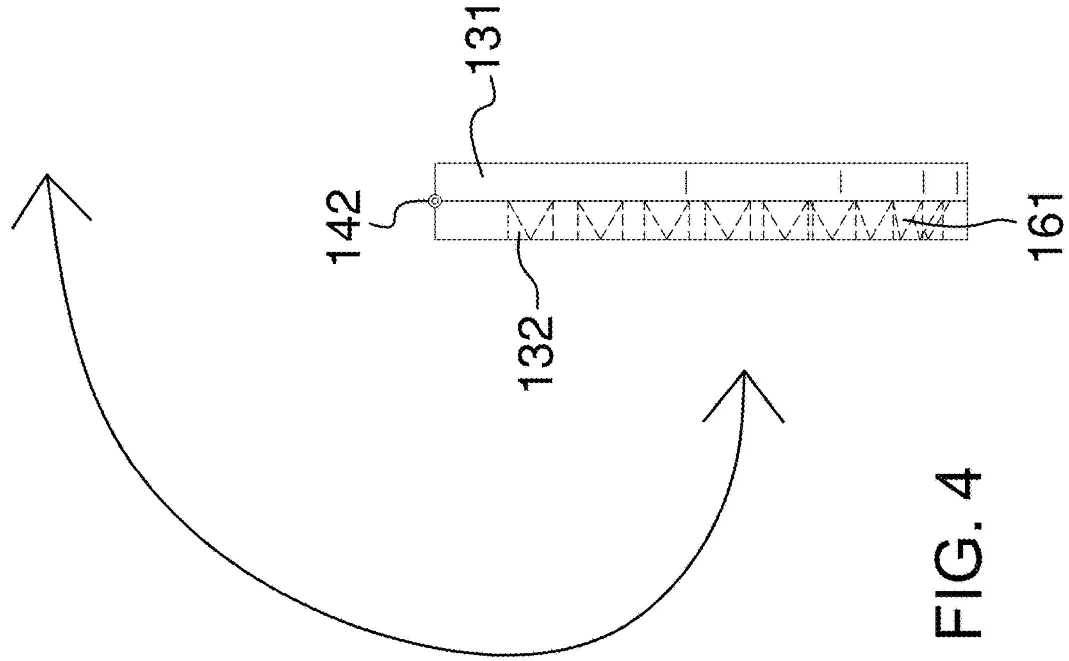
FIG. 4 is a reverse side view of an embodiment of the disclosure.
Figure 3:
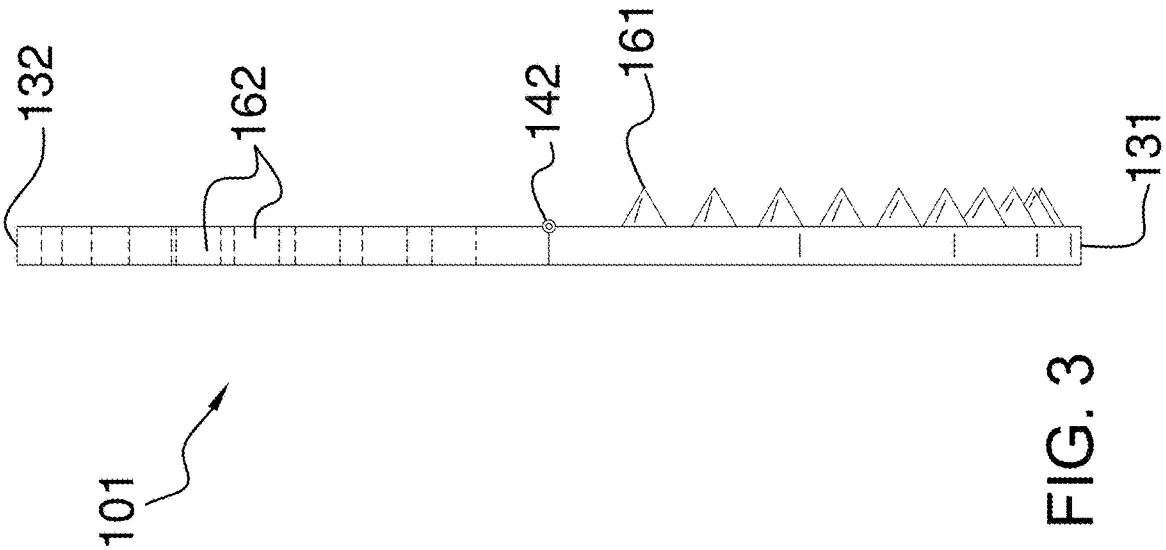
FIG. 3 is a side view of an embodiment of the disclosure.
Figure 5:
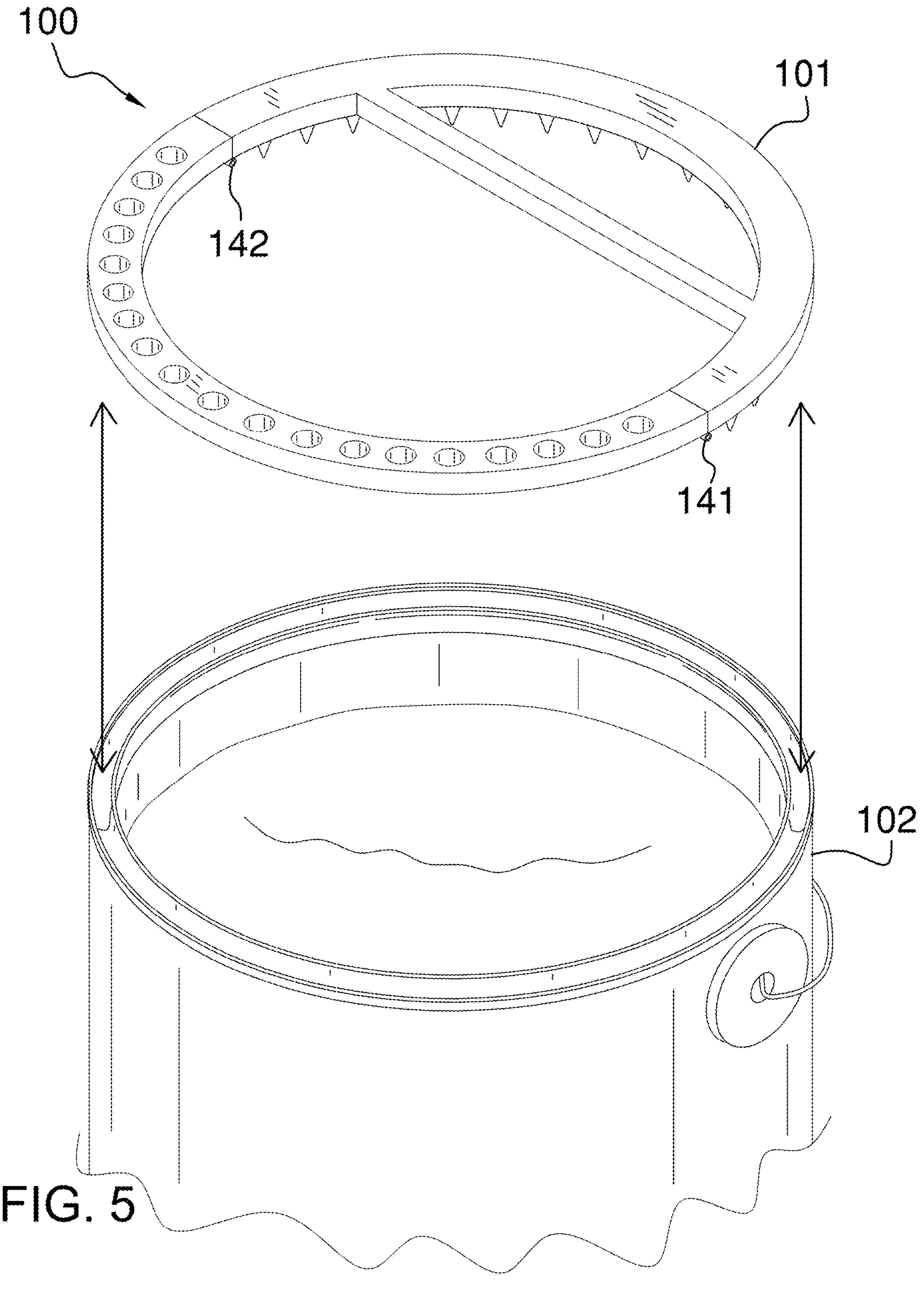
FIG. 5 is an in-use view of an embodiment of the disclosure.
Figure 6:
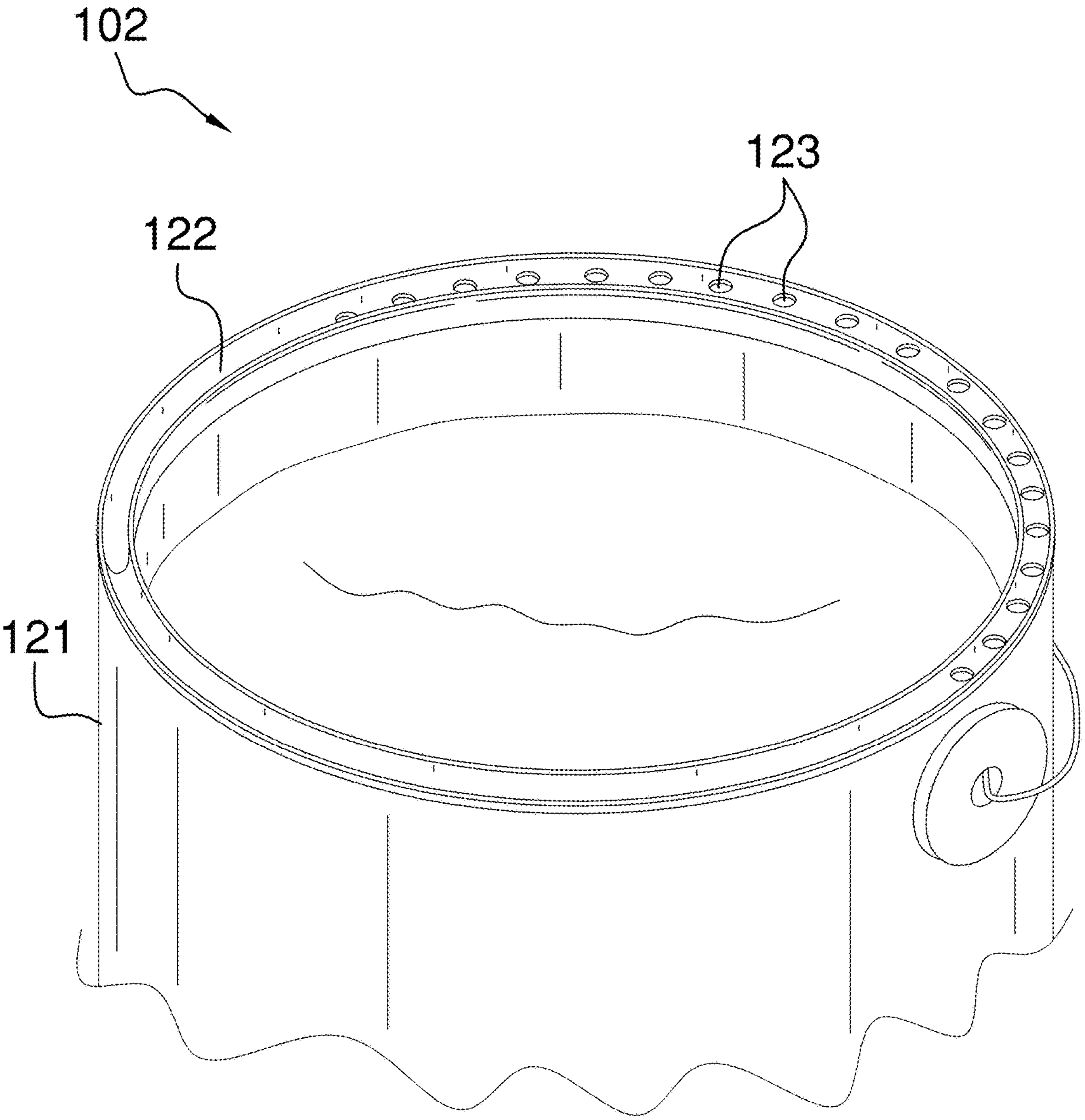
FIG. 6 is an in-use view of an embodiment of the disclosure.

Detailed reference will now be made to one or more potential embodiments of the disclosure, which are illustrated in FIGS. 1 through 6.

The paint can puncturing tool 100 (hereinafter invention) comprises a tool structure 101 and a paint can 102. The paint can 102 is configured for use in storing paint. The tool structure 101 punches a plurality of fluid ports 123 into the paint can 102. The plurality of fluid ports 123 allows the paint contained in the paint can 102 to flow out of or back into the paint can 102 in a controlled manner. Please note that paint being poured from the paint can 102 would normally run down the outside of the paint can 102, which makes a mess. The fluid ports 123 enable the remaining paint that would otherwise roll down the side of the paint can 102 to flow back into the interior of the paint can 102.

The paint can 102 is a container. The paint can 102 is a hollow structure. The paint can 102 is formed with the primary shape of a pan. The paint can 102 is configured for use in storing paint. The paint can 102 comprises a pan structure 121 and a lip tray structure 122. The tool structure 101 punches the plurality of fluid ports 123 in the lip tray structure 122 of the paint can 102.

The pan structure 121 is a prism structure. The pan structure 121 is a hollow structure. The pan structure 121 is a fluid impermeable structure. The pan structure 121 has a pan shape. The pan structure 121 forms the physical structure of the paint can 102 that contains the paint.

The lip tray structure 122 is a tray that is formed on the interior lip of the open face of the pan structure of the paint can 102. The lip tray structure 122 forms a drip pan that helps limit paint spills from the pan structure 121. The lip tray structure 122 is geometrically similar to the open face of the pan structure 121. The lip tray structure 122 fully encloses the perimeter of the interior lip of the open face of the pan structure 121. The lip tray structure 122 is formed with a horizontally oriented solid inferior surface.

The tool structure 101 punches the plurality of fluid ports through the horizontally oriented solid inferior surface of the lip tray structure 122. The plurality of fluid ports 123 is a punched structure that is formed in the horizontally oriented solid inferior surface of the lip tray structure 122. The plurality of fluid ports 123 forms a plurality of negative spaces through the horizontally oriented solid inferior surface such that paint can flow into and out of the lip tray structure 122 through the plurality of fluid ports 123.

The tool structure 101 is a tool. The tool structure 101 is the structure of the invention 100 that forms the plurality of fluid ports 123. The tool structure 101 has the primary shape of a disk. The tool structure 101 forms a ring. The perimeter and the curvature of the tool structure 101 are geometrically identical to the lip tray structure 122 of the paint can 102. The perimeter of the tool structure 101 is sized such that the tool structure 101 inserts into the lip tray structure 122 of the paint can 102. The tool structure 101 comprises a circular disk structure 111 and a working element structure 112.

The circular disk structure 111 is a rigid structure. The circular disk structure 111 is a disk shaped structure. The circular disk structure 111 is a rotating structure. The circular disk structure 111 rotates between a closed position and an open position. The circular disk structure 111 forms a ring shaped structure when rotated into the open position. The circular disk structure 111 forms the handle of the tool formed by the tool structure 101. The circular disk structure 111 further comprises a first semicircular disk structure 131, a second semicircular disk structure 132, a first hinge 141, a second hinge 142, and a grip structure 151. The grip structure 151 attaches to the second semicircular disk structure 132. The first hinge 141 attaches the first semicircular disk structure 131 to the second semicircular disk structure 132. The second hinge 142 attaches the first semicircular disk structure 131 to the second semicircular disk structure 132.

The first semicircular disk structure 131 is a disk shaped structure. The first semicircular disk structure 131 is a rigid structure. The first semicircular disk structure 131 has a semicircular shape. The perimeter and the curvature of the first semicircular disk structure 131 are geometrically identical to a portion of the lip tray structure 122 of the paint can 102. The perimeter of the first semicircular disk structure 131 is sized such that the first semicircular disk structure 131 inserts into the lip tray structure 122 of the paint can 102 to form a composite prism structure.

The second semicircular disk structure 132 is a disk shaped structure. The second semicircular disk structure 132 is a rigid structure. The second semicircular disk structure 132 has a semicircular shape. The perimeter and the curvature of the second semicircular disk structure 132 are geometrically identical to a portion of the lip tray structure 122 of the paint can 102. The perimeter of the second semicircular disk structure 132 is sized such that the second semicircular disk structure 132 inserts into the lip tray structure 122 of the paint can 102 to form a composite prism structure.

The lateral face of the second semicircular disk structure 132 attaches to the first semicircular disk structure 131 such that the second semicircular disk structure 132 rotates relative to the first semicircular disk structure 131. The second semicircular disk structure 132 rotates into the open position to form the circular ring shape of the tool structure 101. The second semicircular disk structure 132 rotates into the open position to form the geometrically identical with the lip tray structure 122 of the paint can 102. The second semicircular disk structure 132 rotates into the open position when the tool structure 101 inserts into the lip tray structure 122. The second semicircular disk structure 132 rotates into the closed position to form a semicircular disk structure. The second semicircular disk structure 132 rotates into the closed position to form a protective structure that encloses the working element structure 112 of the tool structure 101.

The first hinge 141 attaches the lateral face of the first semicircular disk structure 131 to the lateral face of the second semicircular disk structure 132 to form the circular structure of the tool structure 101. The first hinge 141 attaches the lateral face of the first semicircular disk structure 131 to the second semicircular disk structure 132 such that the second semicircular disk structure 132 rotates relative to the first semicircular disk structure 131.

The second hinge 142 attaches the lateral face of the first semicircular disk structure 131 to the lateral face of the second semicircular disk structure 132 to form the circular structure of the tool structure 101. The second hinge 142 attaches the lateral face of the first semicircular disk structure 131 to the second semicircular disk structure 132 such that the second semicircular disk structure 132 rotates relative to the first semicircular disk structure 131.

The grip structure 151 is a prism shaped structure. The grip structure 151 is a rigid structure. An initially selected congruent end of the prism structure of the grip structure 151 permanently attaches to the inner perimeter of the second semicircular disk structure 132 at an initially selected location. The congruent end of the prism structure of the grip structure 151 that is distal from the initially selected congruent end permanently attaches to the inner perimeter of the second semicircular disk structure 132 at a subsequently selected location. The grip structure 151 forms a handle used to carry the invention 100.

The working element structure 112 forms the working element structure 112 of the tool structure 101. The working element structure 112 of the tool structure 101 punches the plurality of fluid ports 123 through the lip tray structure 122 of the paint can 102. The working element structure 112 comprises a plurality of bayonet structures 161 and a plurality of bayonet sleeve structures 162.

Each bayonet structure selected from the plurality of bayonet structures 161 is a rigid structure. Each selected bayonet structure is a composite prism structure. Each selected bayonet structure is formed with a pyramid structure that is further formed with a sharpened apex. Each selected bayonet structure forms the physical structure that punches a fluid port selected from the plurality of fluid ports 123 through the horizontally oriented solid inferior surface of the lip tray structure 122. The plurality of bayonet structures 161 permanently attaches to a congruent end of the disk structure of the first semicircular disk structure 131 of the circular disk structure 111 of the tool structure 101.

Each bayonet sleeve structure selected from the plurality of bayonet sleeve structures 162 is a negative space that is formed through the congruent ends of the disk structure of the second semicircular disk structure 132. Each bayonet sleeve structure selected from the plurality of bayonet sleeve structures 162 is associated with a bayonet structure selected from the plurality of bayonet structures 161. Each selected bayonet sleeve structure is geometrically similar to its associated selected bayonet structure. The span of the length of the inner dimension of each selected bayonet sleeve structure is greater than the outer dimension of the associated selected bayonet structure such that the associated selected bayonet structure inserts into selected bayonet sleeve structure. Each selected bayonet sleeve structure is positioned relative to its associated selected bayonet structure such that the associated selected bayonet structure inserts into the selected bayonet sleeve structure as the second semicircular disk structure 132 rotates into the closed position.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Apex: As used in this disclosure, an apex is a vertex that forms an extreme or solitary point of an object.

Arc: As used in this disclosure, an arc refers to a portion of a circumference or a curved perimeter. When applied to an angle or cant, the arc also refers to a measure of an angular span as measured from an angle formed at the vertex at the center of a circle to the two endpoints of the arc.

Barrier: As used in this disclosure, a barrier is a physical obstacle that forms a boundary between a first space and a second space. The barrier prevents the passage of an object between the first space and the second space.

Bayonet: As used in this disclosure, a bayonet is a prism-shaped or disk-shaped structure that is formed with an apex. The apex may either be a sharpened point or a rounded apex.

Brink: As used in this disclosure, a brink refers to the edge or line formed by the intersection of a first plane or surface and a second plane or surface wherein a cant exists between the first plane or surface and the second plane or surface.

Cant: As used in this disclosure, a cant is an angular deviation from one or more reference lines (or planes) such as a vertical line (or plane) or a horizontal line (or plane).

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Closed Position: As used in this disclosure, a closed position refers to a movable structure that is in an orientation that minimizes the perimetrical boundary presented by the movable structure. The closed position is often referred to as an object being "closed."

Composite Prism: As used in this disclosure, a composite prism refers to a structure that is formed from a plurality of structures selected from the group consisting of a prism structure, a pyramid structure, and a spherical structure. The plurality of selected structures may or may not be truncated or bifurcated. The plurality of prism structures are joined together such that the center axes of each of the plurality of structures are aligned. The congruent ends of any two structures selected from the group consisting of a prism structure and a pyramid structure need not be geometrically similar.

Concave: As used in this disclosure, concave is used to describe: 1) a surface that resembles the interior surface of a sphere; or, 2) a function with a curvature structure wherein a chord that connects any two points of the function will be lesser than (graphically below) or equal to the value of the function at any point along the chord.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Container: As used in this disclosure, a container is a structure that forms a protected space (or protection space) used to store and transport an object. The term containment structure is a synonym for container. Use protected space or protection space.

Convex: As used in this disclosure, convex is used to describe: 1) a surface that resembles the outer surface of a sphere; or, 2) a function with a curvature structure wherein a chord that connects any two points of the function will be greater than (graphically above) or equal to the value of the function at any point along the chord.

Curve: As used in this disclosure, a curve refers to a continuous line that is not a straight line or a continuous surface that is not a planar surface. By continuous is meant that the continuous line or surface changes smoothly over one or more independent variables. Alternately, continuous can be taken to mean that a single valued derivative with respect to any independent variable exists for all points on the curved line or curved surface. A note on usage: within this disclosure, when a prism is said to be curved, what will be meant is that the center axis of the prism is curved.

Curvature: As used in this disclosure, the term curvature is a measure of the change in a curved line (or more formally, a non-Euclidean line). The curvature of a curved line is measured between a first point and a second point on the curved line. The curvature is calculated as the ratio of: a) the angular measure of the arc between the first point and the second point; and, b) the span of the measured distance between the first point and the second point along the curved line. A straight line has no curvature. The curvature of a circle equals the inverse of the radius when the angular measure of the arc is measured in radians. If the term curvature is applied to a non-Euclidean surface, this disclosure assumes that the curvature calculation follows a line with the minimum span of length that that is formed on the surface.

Correspond: As used in this disclosure, the term correspond is used as a comparison between two or more objects wherein one or more properties shared by the two or more objects match, agree, or align within acceptable manufacturing tolerances.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk.

In this disclosure, the congruent ends of the prism-shaped structure that forms the disk are referred to as the faces of the disk.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Environment: As used in this disclosure, an environment refers to the physical conditions surrounding an object. The term environment is often limited to the physical conditions that the object interacts with.

Exterior: As used in this disclosure, the exterior is used as a relational term that implies that an object is not contained within the boundary of a structure or a space.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1. By the term essentially geometrically similar is meant that the primary shapes of two objects are geometrically similar except that there are functional items (such as fastening devices) associated with the primary shape may not maintain the ratio for geometric similarity. By the term roughly geometrically similar is meant that the form factors between the primary shape of the two objects can vary by a factor of up to 10% when the two objects are normalized to be roughly geometrically identical.

Grip: As used in this disclosure, a grip is an accommodation formed on or within an object that allows the object to be grasped or manipulated by a hand.

Handle: As used in this disclosure, a handle is an object by which a tool, object, or door is held or manipulated with the hand.

Hinge: As used in this disclosure, a hinge is a device that permits the turning, rotating, or pivoting of a first object relative to a second object. A hinge designed to be fixed into a set position after rotation is called a locking hinge. A spring loaded hinge is a hinge formed as an elastic structure. The elastic structure of the spring loaded hinge is deformed under a rotating force such that the elastic structure returns the spring loaded hinge back to its relaxed shape after the rotating force is removed from the spring loaded hinge.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity when an object is positioned or used normally.

Inner Dimension: As used in this disclosure, the term inner dimension describes the span from a first inside or interior surface of a container to a second inside or interior surface of a container. The term is used in much the same way that a plumber would refer to the inner diameter of a pipe.

Inner Perimeter and Outer Perimeter: As used in this disclosure, the inner perimeter and the outer perimeter refer to two geometrically similar structures of an object. The inner perimeter refers to the geometrically similar structure with the shorter span of length. The outer perimeter refers to the geometrically similar structure with the greater span of length.

Interior: As used in this disclosure, the interior is used as a relational term that implies that an object is contained within the boundary of a structure or a space.

Lateral Disk Structure: As used in this disclosure, a lateral disk structure refers to the juxtaposition of a first lateral face of a first disk-shaped structure to a second lateral face of a second disk-shaped structure such that: a) the center axes of the first disk and the second disk are parallel; and, b) the congruent ends of the first disk are parallel to the congruent ends of the second disk. The span of the length of the center axes of the first disk and the second disk need not be equal. The form factor of the congruent ends of the first disk and the second disk need not be geometrically similar.

Lip: As used in this disclosure, a lip refers to the region of the lateral face of a pan or tube structure that abuts the perimeter of the open face of the pan or tube structure. By abutting the perimeter of the open face is meant that the lip forms a brink with the surface that forms the perimeter of the open face. The lip of the interior surface of the pan structure is called the interior lip. The lip of the exterior surface of the pan structure is called the exterior lip. The region of the lateral face of a pan structure that abuts the perimeter of the closed face of the pan structure is called the brink lip.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Loop: As used in this disclosure, a loop is the length of a first linear structure including, but not limited to, shafts, lines, cords, or webbings, that is: 1) folded over and joined at the ends forming an enclosed space; or, 2) curved to form a closed or nearly closed space within the first linear structure.

In both cases, the space formed within the first linear structure is such that a second linear structure such as a line, cord or a hook can be inserted through the space formed within the first linear structure. Within this disclosure, the first linear structure is said to be looped around the second linear structure.

N-gon: As used in this disclosure, an N-gon is a regular polygon with N sides wherein N is a positive integer number greater than 2.

Negative Space: As used in this disclosure, negative space is a method of defining an object through the use of open or empty space as the definition of the object itself, or, through the use of open or empty space to describe the boundaries of an object.

Not Significantly Different: As used in this disclosure, the term not significantly different compares a specified property of a first object to the corresponding property of a reference object (reference property). The specified property is considered to be not significantly different from the reference property when the absolute value of the difference between the specified property and the reference property is less than 10.0% of the reference property value. A negligible difference is considered to be not significantly different.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction. In a one to one correspondence, the first element of the first set is said to be associated to the second element of the second set to which the first element corresponds.

Open Position: As used in this disclosure, an open position refers to a movable structure that is in an orientation that presents a perimetrical boundary of the movable structure that is greater than the closed position. The open position is often referred to as an object being "open."

Orientation: As used in this disclosure, orientation refers to the positioning of a first object relative to: 1) a second object; or, 2) a fixed position, location, or direction. Outer Dimension: As used in this disclosure, the term outer dimension describes the span from a first exterior or outer surface of a tube or container to a second exterior or outer surface of a tube or container. The term is used in much the same way that a plumber would refer to the outer diameter of a pipe.

Paint: As used in this disclosure, when used as a noun the term paint refers to a pigment based colloid or solution that is applied to a surface as a coating of the surface. When used as a verb, the term paint refers to the application of paint to a surface.

Pan: As used in this disclosure, a pan is a hollow containment structure. The pan has a shape selected from the group consisting of: a) a prism; and, b) a truncated pyramid. The pan has a single open face. The open face of the pan is often, but not always, the superior face of the pan. The open face is a surface selected from the group consisting of: a) a congruent end of the prism structure that forms the pan; b) a lateral face of the prism structure that forms the pan, c) the base face of the truncated pyramid structure; and, d) the truncated face of the truncated pyramid structure. A semi-enclosed pan refers to a pan wherein the closed end of prism structure of the pan and/or a portion of the lateral face of the pan is also open.

Perimeter: As used in this disclosure, a perimeter is one or more curved or straight lines that bounds an enclosed area on a plane or surface. The perimeter of a circle is commonly referred to as a circumference.

Perimetrical Boundary: As used in this disclosure, a perimetrical boundary is a hypothetical rectangular block that contains an object. Specifically, the rectangular block selected to be the perimetrical boundary is the rectangular block with the minimum volume that fully contains the object. In a two-dimensional structure, the perimetrical boundary is the rectangle with the minimum surface area.

Port: As used in this disclosure, a port is an aperture formed in an object that allows fluid to flow through the boundary of the object.

Primary Shape: As used in this disclosure, the primary shape refers to a description of the rough overall geometric shape of an object that is assembled from multiple components or surfaces. The term essential primary shape is used to indicate the exclusion of functional items that are attached to the structure of the primary shape.

Primary Structure: As used in this disclosure, a primary structure refers to the component of an object that the other components attach to. The primary structure is also called the base structure.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Protected Space: As used in this disclosure, a protected space is a negative space within which an object is stored. The protected space is enclosed by a barrier structure that: a) prevents damage to the object contained within the protected space; b) maintains conditions that are appropriate for the object; c) protects the object within the protected space from potential dangers that are outside of the protected space; or, d) maintains the privacy of the object within the protected space.

Punched Structure: As used in this disclosure, a punched structure is a prism structure that is formed with a plurality of negative spaces that are formed through the both congruent ends of the prism structure. Each negative space selected from the plurality of negative spaces forms a prism shaped structure. The center axis of each selected negative space is parallel to the center axis of the prism structure. Unless stated otherwise within this disclosure, the plurality of negative spaces are distributed evenly around the perimeter of the congruent ends of the prism structure. Each negative space selected from the plurality of negative spaces is referred to as a channel.

Pyramid: As used in this disclosure, a pyramid is a three-dimensional shape that comprises a base formed in the shape of an N-gon (wherein N is an integer) with N triangular faces that rise from the base to converge at a point above the base. The center axis of a pyramid is the line drawn from the vertex where the N faces meet to the center of the N-gon base. The center axis of a right pyramid is perpendicular to the N-gon base. Pyramids can be further formed with circular or elliptical bases which are commonly referred to as a cone or an elliptical pyramid respectively. A pyramid is defined with a base, an apex, and a lateral face. The base is the N-gon shaped base described above. The apex is the vertex that defines the center axis. The lateral face is formed from the N triangular faces described above.

Rigid Structure: As used in this disclosure, a rigid structure is a solid structure formed from an inelastic material that resists changes in shape. A rigid structure will permanently deform as it fails under a force. See bimodal flexible structure.

Ring: As used in this disclosure, a ring is a term that is used to describe a disk-like structure through which a negative space is formed through the faces of the disk-like structure. Rings are often considered loops. The negative space formed through the faces of the disk-like structure is called the characteristic aperture.

Rotation: As used in this disclosure, rotation refers to the cyclic movement of an object around a fixed point or fixed axis. The verb of rotation is to rotate.

Roughly: As used in this disclosure, roughly refers to a comparison between two objects. Roughly means that the difference between one or more parameters of the two compared objects are not significantly different.

Semicircle: As used in this disclosure, a semicircle refers to a planar structure that is formed as one-half of a circle. The circle that forms the semicircle is bisected by a line that passes through the center point of the circle.

Sharp: As used in this disclosure, the term sharp refers to an apex or a brink that is formed in a first structure that is capable of puncturing or cutting a second structure.

Sleeve: As used in this disclosure, a sleeve is a tube like covering that is placed over an object.

Sphere: As used in this disclosure, a sphere refers to a structure wherein every point of the surface of the structure is equidistant from a center point. A circle refers to the two dimensional structure that that is projected onto the bifurcating plane of a spherical section by the surface of the sphere. All the points of the circle are equidistant from a center point that is found by the perpendicular projection of the center of the sphere through the bifurcating plane.

Superior: As used in this disclosure, the term superior refers to a directional reference that is parallel to and in the opposite direction of the force of gravity when an object is positioned or used normally.

Spit: As used in this disclosure, a spit refers to a composite prism structure formed by the combination of a prism and a pyramid such that the apex of the pyramid forms a point capable of pushing through the surface of a second structure.

Stab: As used in this disclosure, to stab is a verb that means to push a bayonet into an object.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Tool: As used in this disclosure, a tool is a device, an apparatus, or an instrument that is used to carry out an activity, operation, or procedure. A tool generally comprises a working element and a handle. The handle of a tool that forms a sub-component of a larger structure is referred to as a mount.

Tray: As used in this disclosure, a tray is a disk-shaped pan structure that has a raised rim formed around the perimeter for the purpose of containing fluids within the structure of the tray. Trays will generally give an impression of being a shallow containment device. Trays are often used for carrying food and drink or for holding small items.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Working Element: As used in this disclosure, the working element of a tool is the physical element on the tool that performs the actual activity, operation, or procedure the tool is designed to perform. For example, the cutting edge of a blade is the working element of a knife.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A paint can puncturing tool comprising a tool structure and a paint can;

wherein the paint can is configured for use in storing paint;

wherein the tool structure punches a plurality of fluid ports into the paint can;

wherein the paint can comprises a pan structure and a lip tray structure;

wherein the lip tray structure is a tray that is formed on the pan structure;

wherein the tool structure comprises a circular disk structure and a working element structure;

wherein the working element structure is formed on the circular disk structure;

wherein the working element structure forms the working element structure of the tool structure;

wherein the working element structure of the tool structure punches the plurality of fluid ports through the lip tray structure of the paint can;

wherein the circular disk structure further comprises a first semicircular disk structure, a second semicircular disk structure, a first hinge, a second hinge, and a grip structure;

wherein the grip structure attaches to the first semicircular disk structure;

wherein the first hinge attaches the first semicircular disk structure to the second semicircular disk structure;

wherein the second hinge attaches the first semicircular disk structure to the second semicircular disk structure.

2. The paint can puncturing tool according to claim 1 wherein the paint can is a container;

wherein the paint can is a hollow structure;

wherein the paint can is configured for use in storing paint.

3. The paint can puncturing tool according to claim 2 wherein the pan structure is a prism structure;

wherein the pan structure is a hollow structure;

wherein the pan structure is a fluid impermeable structure;

wherein the pan structure has a pan shape;

wherein the lip tray structure is a tray that is formed on the interior lip of the open face of the pan structure of the paint can;

wherein the lip tray structure is geometrically similar to the open face of the pan structure;

wherein the lip tray structure fully encloses the perimeter of the interior lip of the open face of the pan structure;

wherein the lip tray structure is formed with a horizontally oriented solid inferior surface;
wherein the tool structure punches the plurality of fluid ports through the horizontally oriented solid inferior surface of the lip tray structure;
wherein the plurality of fluid ports is a punched structure that is formed in the horizontally oriented solid inferior surface of the lip tray structure;
wherein the plurality of fluid ports forms a plurality of negative spaces through the horizontally oriented solid inferior surface such that paint can flow into and out of the lip tray structure through the plurality of fluid ports.

4. The paint can puncturing tool according to claim 3
wherein the tool structure is a tool;
wherein the tool structure is the structure of the paint can puncturing tool that forms the plurality of fluid ports;
wherein the tool structure has the primary shape of a disk;
wherein the tool structure forms a ring;
wherein the perimeter and the curvature of the tool structure are geometrically identical to the lip tray structure of the paint can;
wherein the perimeter of the tool structure is sized such that the tool structure inserts into the lip tray structure of the paint can.

5. The paint can puncturing tool according to claim 4
wherein the circular disk structure is a rigid structure;
wherein the circular disk structure is a disk shaped structure;
wherein the circular disk structure is a rotating structure;
wherein the circular disk structure rotates between a closed position and an open position;
wherein the circular disk structure forms a ring shaped structure when rotated into the open position.

6. The paint can puncturing tool according to claim 5
wherein the first semicircular disk structure is a disk shaped structure;
wherein the first semicircular disk structure is a rigid structure;
wherein the first semicircular disk structure has a semicircular shape;
wherein the perimeter and the curvature of the first semicircular disk structure are geometrically identical to a portion of the lip tray structure of the paint can;
wherein the perimeter of the first semicircular disk structure is sized such that the first semicircular disk structure inserts into the lip tray structure of the paint can to form a composite prism structure;
wherein the second semicircular disk structure is a disk shaped structure;
wherein the second semicircular disk structure is a rigid structure;
wherein the second semicircular disk structure has a semicircular shape;
wherein the perimeter and the curvature of the second semicircular disk structure are geometrically identical to a portion of the lip tray structure of the paint can;
wherein the perimeter of the second semicircular disk structure is sized such that the second semicircular disk structure inserts into the lip tray structure of the paint can to form a composite prism structure;
wherein the lateral face of the second semicircular disk structure attaches to the first semicircular disk structure such that the second semicircular disk structure rotates relative to the first semicircular disk structure;
wherein the second semicircular disk structure rotates into the open position to form the circular ring shape of the tool structure;
wherein the second semicircular disk structure rotates into the open position to form the geometrically identical with the lip tray structure of the paint can;
wherein the second semicircular disk structure rotates into the open position when the tool structure inserts into the lip tray structure;
wherein the second semicircular disk structure rotates into the closed position to form a semicircular disk structure;
wherein the second semicircular disk structure rotates into the closed position to form a protective structure that encloses the working element structure of the tool structure.

7. The paint can puncturing tool according to claim 6
wherein the working element structure comprises a plurality of bayonet structures and a plurality of bayonet sleeve structures;
wherein each bayonet structure selected from the plurality of bayonet structures is a rigid structure;
wherein each selected bayonet structure is a composite prism structure;
wherein each selected bayonet structure is formed with a pyramid structure that is further formed with a sharpened apex;
wherein each selected bayonet structure forms the physical structure that punches a fluid port selected from the plurality of fluid ports through the horizontally oriented solid inferior surface of the lip tray structure;
wherein the plurality of bayonet structures permanently attaches to a congruent end of the disk structure of the first semicircular disk structure of the circular disk structure of the tool structure;
wherein each bayonet sleeve structure selected from the plurality of bayonet sleeve structures is a negative space that is formed through the congruent ends of the disk structure of the second semicircular disk structure;
wherein each bayonet sleeve structure selected from the plurality of bayonet sleeve structures is associated with a bayonet structure selected from the plurality of bayonet structures;
wherein each selected bayonet sleeve structure is geometrically similar to its associated selected bayonet structure;
wherein the span of the length of the inner dimension of each selected bayonet sleeve structure is greater than the outer dimension of the associated selected bayonet structure such that the associated selected bayonet structure inserts into selected bayonet sleeve structure;
wherein each selected bayonet sleeve structure is positioned relative to its associated selected bayonet structure such that the associated selected bayonet structure inserts into the selected bayonet sleeve structure as the second semicircular disk structure rotates into the closed position.

8. The paint can puncturing tool according to claim 7
wherein the first hinge attaches the lateral face of the first semicircular disk structure to the lateral face of the second semicircular disk structure to form the circular structure of the tool structure;
wherein the first hinge attaches the lateral face of the first semicircular disk structure to the second semicircular disk structure such that the second semicircular disk structure rotates relative to the first semicircular disk structure;
wherein the second hinge attaches the lateral face of the first semicircular disk structure to the lateral face of the second semicircular disk structure to form the circular structure of the tool structure;

wherein the second hinge attaches the lateral face of the first semicircular disk structure to the second semicircular disk structure such that the second semicircular disk structure rotates relative to the first semicircular disk structure;

wherein the grip structure is a prism shaped structure;

wherein the grip structure is a rigid structure;

wherein an initially selected congruent end of the prism structure of the grip structure permanently attaches to the inner perimeter of the first semicircular disk structure at an initially selected location;

wherein the congruent end of the prism structure of the grip structure that is distal from the initially selected congruent end permanently attaches to the inner perimeter of the first semicircular disk structure at a subsequently selected location.

* * * * *